A. L. FARR.
GAGE COCK.
APPLICATION FILED AUG. 4, 1913.
1,129,970.
Patented Mar. 2, 1915.
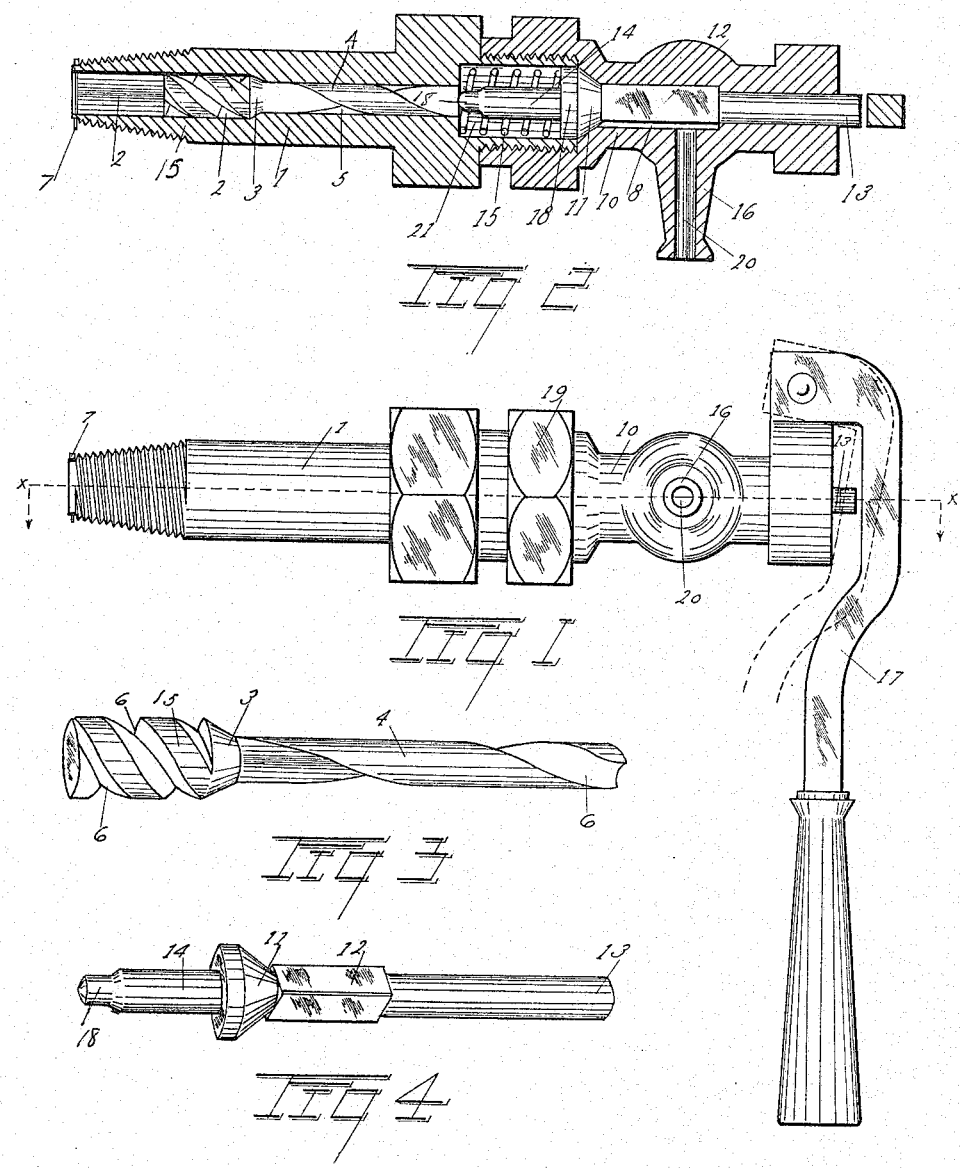

UNITED STATES PATENT OFFICE.

ADRIAN L. FARR, OF OGDEN, UTAH.

GAGE-COCK.

1,129,970. Specification of Letters Patent. Patented Mar. 2, 1915.

Application filed August 4, 1913. Serial No. 782,949.

*To all whom it may concern:*

Be it known that I, ADRIAN L. FARR, a citizen of the United States, residing at Ogden, in the county of Weber and State of Utah, have invented certain new and useful Improvements in Gage-Cocks, of which the following is a specification.

My invention relates to gage cocks, and has for its object to provide a gage cock which will regulate the flow of water or steam and which is so constructed that the parts thereof which are subjected to the greatest wear may be repaired without closing down the machinery on which said gage cock is used.

These and other objects which will be apparent I accomplish with the device illustrated in the accompanying drawings in which similar letters of reference indicate like parts throughout the several figures, and as described in the specification forming a part of the application and pointed out in the appended claim.

In the drawings Figure 1 is a side elevation of the device. Fig. 2 is a longitudinal section through the device on line $x$ $x$ of Fig. 1. Fig. 3 is an elevation of the inner valve and stem. Fig. 4 is an elevation of the outer valve and stem.

I have observed that in a great many steam boilers the valves in the gage cocks become worn or incrusted with the solid matter carried in the water, to such an extent that they leak, and as there is usually one valve the fire must be drawn and the pressure of water or steam removed in order to repair the valve. Frequently this leakage of the valve is caused by small particles of solid matter getting between the valve and its seat. When such is the case very little repair on the valve or seat will cure the defect; but without having some way provided whereby the machinery may be allowed to operate without the use of the defective valve the required repairs can not be made.

I have provided two valves within the same device, either of which will close the egress whereby the operation of the outer of said valves will actuate the inner, which inner valve otherwise has but little wear or chance to become injured or clogged. This leaves one of said valves in said gage cock always in repair, and the outer of said valves may be removed without closing down the operated machinery.

In the drawings I have shown the casing which is to be screwed into the boiler, as built in two sections or parts having a centrally disposed longitudinal conduit or bore of different sections and various diameters. In the inner casing 1 the conduit 2 has an intermediate section 5 smaller in diameter than the end sections. The shoulder between the said sections 2 and 5 is beveled to form a seat for the inner valve 3. Said valve 3 is carried on a stem 4 which is made to operate within the casing 1. One portion 15 of said stem is fitted and operated in the section 2, and the other portion in the intermediate section 5 of said conduit or bore. A pin 7 is shown as one means that may be used to hold said valve 3 near its seat. The other section of said conduit 2 shown at 21 is made larger to hold therein the spiral spring 15 and a portion of the outer or main valve stem shown at 18. The outer end portion of the said casing 1 adjacent the conduit 21 is externally threaded, and on said threaded portion is screwed the other part 10 of the casing. Said part 10 of the casing has a conduit 8 therethrough in axial alinement with said conduit 5. The shoulder at the junction of the threaded interior and said conduit 8 is beveled to form a seat for a valve 11, which valve is carried on a valve stem 12, having portions cut from the peripheric face thereof to provide therearound passage ways for water or steam through said conduit when said valve 11 is unseated. Said stem 12 has one portion 13 extended without the end of said casing 10 and the other end portion 14 contacts with the end of said valve stem 4, to move said stem 4 longitudinally within the casing 1. Carried on said portion 14 of said stem 12 is the spiral spring 15 with one end thereof bearing against the said stem 12 and the other end against the casing 1 to hold the valve 11 normally within its seat. A nozzle 16 is provided on one side of said casing 10 having an opening 20 therethrough which connects with the interior of said conduit 8. The outer end portion of said casing 10 has a radially extended lug integrally formed thereon to which the hand lever 17 is pivoted by means of which lever said valve stems 4 and 12 are longitudinally moved to unseat the valves 3 and 11. Spiral grooves or channels 6 are cut in the sides of the valve stem 4, through which water is allowed to flow when the said valve 11 is moved longitudinally by said lever 17, and thereby said valve 3 and stem 4 are rotated within the said channels 2 and 5. I thus provide a means to prevent solid particles of matter from settling around the valve 3 or stem 4 and causing either of them to stick or the valve to leak. As will be readily apparent the greatest wear will be on the valve 11, and should it need repairing or cleaning, the outer section 10 of the casing may be removed by means of a wrench applied at 19, and the said valve 11 and parts of my device connected therewith taken off. In that event the said valve 3 will seat and close the conduit 2.

Having thus described my invention I desire to secure by Letters Patent and claim:—

A gage cock comprising two casing members adapted for endwise connection, each of said members being formed with a longitudinal bore, a valve stem provided with a valve intermediate its ends operative in one bore, said bore being formed with a valve seat to be engaged by the valve, the portions of said stem on opposite sides of the valve fitting the bore of the member to guide said stem, said stem in both directions beyond the valve being formed with a spiral channel, a valve stem operative in the bore of the other member and provided with a valve intermediate its ends, the bore of said latter member being formed with a valve seat to coöperate with said valve, said latter valve stem bearing against the end of the first mentioned valve stem to actuate the latter in the endwise actuation of the former.

In testimony whereof I have affixed my signature in presence of two witnesses.

ADRIAN L. FARR.

Witnesses:
SAM RANEY,
W. E. WOOD.

Copies of this patent may be obtained for five cents each, by addressing the "Commissioner of Patents, Washington, D. C."